US010751826B2

(12) United States Patent
Manthe et al.

(10) Patent No.: US 10,751,826 B2
(45) Date of Patent: Aug. 25, 2020

(54) CONSTANT CURRENT CONTROL SYSTEMS AND METHODS

(71) Applicant: ILLINOIS TOOL WORKS INC., Glenview, IL (US)

(72) Inventors: Alan Adam Manthe, Hortonville, WI (US); Craig Steven Knoener, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 866 days.

(21) Appl. No.: 15/137,793

(22) Filed: Apr. 25, 2016

(65) Prior Publication Data

US 2017/0189985 A1 Jul. 6, 2017

Related U.S. Application Data

(60) Provisional application No. 62/286,764, filed on Jan. 25, 2016, provisional application No. 62/274,117, filed on Dec. 31, 2015.

(51) Int. Cl.
*B23K 9/10* (2006.01)
*H02M 3/335* (2006.01)
(Continued)

(52) U.S. Cl.
CPC ............ *B23K 9/1043* (2013.01); *B23K 9/095* (2013.01); *B23K 9/0953* (2013.01);
(Continued)

(58) Field of Classification Search
CPC .... B23K 9/1043; B23K 9/095; B23K 9/0953; B23K 9/0956; B23K 9/1075; B23K 9/167;
(Continued)

(56) References Cited

U.S. PATENT DOCUMENTS 4,963,715 A * 10/1990 Tuttle .................. B23K 9/0672
219/130.31
5,162,984 A * 11/1992 Castagnet ............... H02M 1/10
363/143
(Continued)

FOREIGN PATENT DOCUMENTS

CN 1868655 11/2006
CN 101157154 4/2008
(Continued)

OTHER PUBLICATIONS

Notification of Transmittal of the International Search Report and the Written Opinion of the International Searching Authority, or the Declaration, in international application No. PCT/US2016/069087 dated Apr. 13, 2017 (12 pages).
(Continued)

*Primary Examiner* — Chee-Chong Lee
(74) *Attorney, Agent, or Firm* — McAndrews, Held & Malloy, Ltd.

(57) ABSTRACT

Systems and methods for providing a constant current controller for use in constant current welding applications are described. In one embodiment, a current controller controls the output current of the welding torch without directly measuring the output current of the welding torch. The current controller controls or sets a current in a primary winding of a transformer in an inverter of a welding power supply to control the output current of the welding torch.

4 Claims, 4 Drawing Sheets

(51) Int. Cl.
  *B23K 9/167* (2006.01)
  *B23K 10/00* (2006.01)
  *B23K 9/095* (2006.01)
(52) U.S. Cl.
  CPC .......... *B23K 9/0956* (2013.01); *B23K 9/1075* (2013.01); *B23K 9/167* (2013.01); *B23K 10/00* (2013.01); *B23K 10/006* (2013.01); *H02M 3/33507* (2013.01); *H02M 3/33546* (2013.01); *H02M 3/33569* (2013.01)
(58) Field of Classification Search
  CPC . B23K 10/00; B23K 10/006; H02M 3/33507; H02M 3/33546; H02M 3/33569
  USPC .................................................. 219/130.32
  See application file for complete search history.

(56) References Cited

U.S. PATENT DOCUMENTS

| | | | | |
|---|---|---|---|---|
| 5,272,313 | A * | 12/1993 | Karino | H02H 11/007 219/130.21 |
| 5,319,533 | A * | 6/1994 | Reynolds | B23K 9/1006 219/137 PS |
| 5,343,017 | A * | 8/1994 | Karino | B23K 9/0731 219/130.4 |
| 6,002,103 | A | 12/1999 | Thommes | |
| 2010/0308027 | A1 | 12/2010 | Vogel | |
| 2015/0060426 | A1 | 3/2015 | Schartner | |

FOREIGN PATENT DOCUMENTS

| | | |
|---|---|---|
| CN | 101259557 | 9/2008 |
| CN | 104321158 | 1/2015 |
| EP | 1 199 791 A2 | 4/2002 |

OTHER PUBLICATIONS

PCT, Notification Concerning Transmittal of the International Preliminary Report on Patentability in Application No. PCT/US2016/069087 dated Jul. 12, 2018 (7 pages).
Canadian Office Action Appln No. 3,006,579 dated Mar. 22, 2019.
Miller Elec. Mfg. Co., XMT® 350 CC/CV Auto-Line, TM-2247R Multiprocess Welding, Technical Manual, Feb. 2016 (158 pgs.).
Canadian Office Action Appln No. 3,006,579 dated May 4, 2020.

* cited by examiner

CONSTANT CURRENT CONTROL SYSTEMS AND METHODS

RELATED APPLICATIONS/INCORPORATION BY REFERENCE

The present application claims priority to and benefit from U.S. Application No. 62/274,117, filed Dec. 31, 2015, and U.S. Application No. 62/286,764, filed Jan. 25, 2016. The above-identified applications are hereby incorporated by reference herein in their entirety.

BACKGROUND

Power supplies used in welding typically convert alternating current (AC) power from a wall outlet to an output that is suitable for welding operations. The output power can be provided at a constant output current between the welding torch and a workpiece that can be controlled by directly measuring the output current of the welding torch, for example, at the contact tip or electrode of the welding torch.

Since the output current at the contact tip of the welding torch can be quite large during a welding operation, the current sensor used to directly measure the output current is typically a very expensive device such as a high current Hall Effect current sensor or a resistive shunt device. Such devices can be very expensive since they need to measure very high weld currents and need to be fairly accurate.

Further, such devices tend to be quite large such that they cannot be mounted on a printed circuit board assembly. Accordingly, additional cables are employed, thereby further adding to the cost burden for this type of architecture.

What is needed is circuitry that can control the output current of the welding torch without directly measuring the output current of the welding torch.

BRIEF SUMMARY

Methods and systems are provided for a constant current controller for use in welding applications substantially as illustrated by and/or described in connection with at least one of the figures, as set forth more completely in the claims.

DETAILED DESCRIPTION

Some embodiments of the present disclosure relate to systems and methods for providing a constant current controller for use in welding applications.

Some embodiments of the present disclosure provide a welding power supply that operates in a constant current process (e.g., stick welding, gas tungsten arc welding (GTAW), tungsten inert gas (TIG) welding, plasma cutting, etc.) in which there is no direct feedback of the output current at the electrode of the welding torch. The current control is achieved by measuring a main transformer primary current, which is substantially less than the output current at the welding torch electrode, and using the transformer primary current to control the weld output current. One advantage to this type of control is that an expensive high current sensing device (e.g., a high current Hall Effect current sensor) is no longer needed to control output current so the overall system cost is reduced. A further advantage is that the circuitry used to control the output current, unlike the direct current measurement arrangement, can be adapted for mounting on a printed circuit board assembly.

Figure 1:
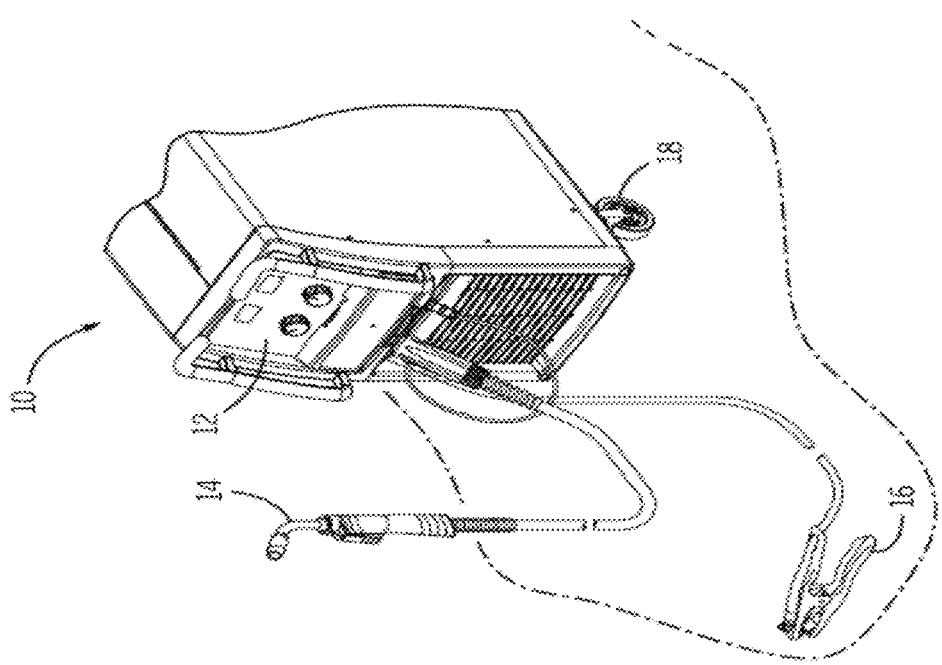
FIG. 1 shows an embodiment of a power supply in a welding system according to the present disclosure.

FIG. 1 shows an embodiment of welding power supply 10 that powers, controls, and provides a constant current welding process according to the present disclosure. The side of the power supply 10 that faces the operator includes a control panel 12, through which the operator can control the supply of, for example, one or more the following: power, weld voltage, gas flow, wire feed, weld current, etc. to a welding torch 14. A work lead clamp 16 connects to a workpiece to close the circuit between the torch 14, the workpiece, and the power supply 10, and to ensure proper current. In some embodiments, such as for stick welding operations, the torch 14 can include, for example, an electrode and/or an electrode holder. The portability of the power supply 10 can be enhanced by a set of wheels 18, which enable the operator to move the power supply 10 to the location of the welding operation. Internal components of the power supply 10 can be configured to convert power from a wall outlet or other source of AC or direct current (DC) voltage, such as a generator, battery or other source of power, to an output consistent with the voltage, current, and/or power requirements of a welding arc maintained between the workpiece and the welding torch 14. In some embodiments, the power supply 10 is configured to maintain a constant current between the torch 14 and the workpiece during the welding operation.

In some embodiments, the power supply 10 can be configured to control the output current of the welding torch 14 without directly sensing the output current, which can be very costly in view of the high current requirements of most welding operations. For example, a costly current sensor for directly measuring the output current of the welding torch 14 can be a high current, Hall Effect current sensor. Instead of using a costly current sensor for directly measuring the output current of the welding torch 14, the power supply 10 can be configured to directly measure the output voltage of the welding torch 14. The output voltage of the welding torch 14 is relatively small and voltage sensors used to directly measure such output voltages are relatively inexpensive. The power supply 10 can be configured to use the directly measured output voltage of the welding torch 14 to control the output current and/or to maintain a constant output current, for example.

In some embodiments, the power supply 10 can be further configured to measure and/or compare a current in a primary winding of a transformer before the current is transformed in a secondary winding of the transformer into the high output current of the welding torch 14. The current in the primary winding of the transformer is relatively small and thus does not require costly high current sensors for measurements and/or comparisons. The power supply 10 can be configured to use the measured output voltage of the welding torch 14 and the measured and/or compared current in the primary winding of the transformer to control the output current and/or to maintain a constant output current, for example, of the welding torch 14.

In some embodiments, the power supply 10 is inverter-based and includes one or more inverters for producing the output current (e.g., weld output current) of the welding torch 14. In some embodiments, the power supply 10 is configured with interleaved two (or more) interleaved inverters. With this topology, output current control can be implemented using a type of primary peak current mode control. However, this topology does not employ a current sensing element on the system output to control and regulate the constant current process.

In some embodiments, the ripple frequency seen on the output is twice that of the fundamental switching frequency of the inverters. To control the output current, the switching frequency of the power source can reduced. The switching frequency can be reduced by disabling one of the inverters during the short circuit condition. When one inverter is disabled, the output frequency is the same as the fundamental frequency of each of the inverters or half the original frequency (i.e., the frequency when both inverters are enabled in this example). This reduction in output ripple frequency limits the current (and heat) being delivered to the workpiece.

By employing the interleaved inverter arrangement in the power supply 10, some embodiments avoid circuit complexity without a loss in response time. For example, by using the interleaved inverter arrangement, some embodiments can avoid additional circuitry that would continuously slew the frequency through a time dependent control loop. In contrast, by using the interleaved inverter arrangement, some embodiments can change the output frequency (e.g., by double or by half) almost instantly by enabling or disabling one of the inverters, for example, via switches in the inverters. The switches can be controlled (e.g., turned off or on) by sensors that detect, for example, a short circuit condition or a normal operating condition during a welding operation. Further, by using the interleaved inverter arrangement, some embodiments provide that the fundamental frequency of any of the interleaved inverter circuits does not change. This is different from the more complicated circuit in which the fundamental frequency of an inverter circuit is changed by a frequency control loop.

In some embodiments, by using the interleaved inverter arrangement, welder current can be controlled, for example, into a short circuit condition (e.g., a TIG lift start). The interleaved inverter arrangement can limit the energy that is provided into the short circuit so as not to melt and/or fuse the tungsten (or other material) and the base material together, thereby causing "sticky" starts.

Further advantages and details concerning the use of interleaved inverters in the power supply 10 can be found in U.S. Application No. 62/274,117, filed Dec. 31, 2015, and U.S. Application No. 62/286,764, filed Jan. 25, 2016, which are hereby incorporated by reference herein in their entirety.

Figure 2:
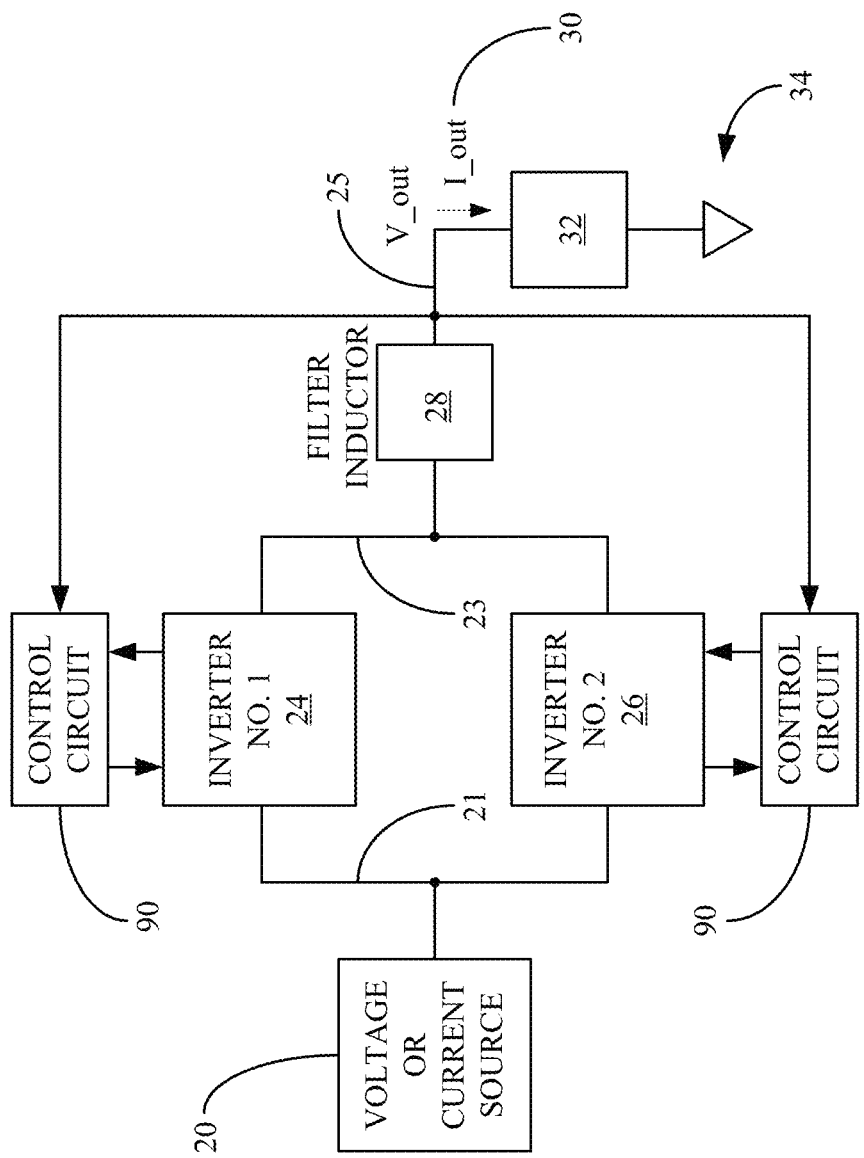
FIG. 2 shows an embodiment of some components of a power supply system with a current control circuit according to the present disclosure.

FIG. 2 illustrates an exemplary block diagram of some components that are part of the power supply 10 (e.g., a welding power supply) according to an embodiment of the present disclosure. Referring to FIG. 2, a voltage or current source 20 is configured to provide a DC current or voltage to a first inverter circuit 24 and a second inverter circuit 26. In some embodiments, the voltage or current source 20 may be a DC source including one or more batteries. In some embodiments, the voltage or current source 20 can include a circuit that rectifies an incoming AC voltage or current and converts it into a DC voltage or current.

In some embodiments, the first inverter circuit 24 and the second inverter circuit 26 can be configured in a parallel arrangement or an interleaved arrangement. On one side, the first inverter circuit 24, the second inverter circuit 26, and the voltage or current source 20 are connected to a first electrical circuit node 21. On the other side, the first inverter circuit 24, the second inverter circuit 26, and the filter inductor 28 are connected to a second electrical circuit node 23.

FIG. 2 also shows a control circuit 90 according to an embodiment of the present disclosure. Although shown in FIG. 2 as two control circuits 90, the control circuit 90 can be more or less than two control circuits 90. Control circuit 90 is configured to receive voltage feedback from the output electrical node 25 and/or from one or more of the inverters 24, 26. The control circuit 90 is also configured to measure the voltage feedback and to measure and/or compare a current in one or more primary windings of the one or more transformers of the one or more inverters 24, 26. Further, the control circuit 90 is configured to determine or calculate and to generate a reference current that is used to set or control the current in the one or more primary windings of the one or more transformers of the one or more inverters 24, 26. The determined or calculated reference current can be based on, for example, a feedback voltage from the output of the welding torch 14 and/or a current command signal. By setting or controlling the current in the one or more primary windings of the one or more transformers of the one or more inverters 24, 26, the control circuit 90 controls (e.g., sets) the output current coming out of the transformers, the inverters 24, 26, and the welding torch 14.

The inverter circuits 24, 26 operate to combine their respective outputs at a single node, which feeds into a filter inductor 28 that supplies an output voltage V_out and/or an output current I_out for the welding operation. By disabling one of the inverter circuits 24, 26, the output current I_out can be reduced in frequency by half. The welding arc 32 is supplied with a welding current 30 and is connected to workpiece 34. In some embodiments, individual inductors may be utilized in place of the filter inductor 28. In other embodiments, the inductor 28 may have multiple windings used to combine the outputs of the two inverter circuits 24, 26.

In operation, the control circuit 90 measures (e.g., directly measures) the voltage at the output of the welding torch 14 (e.g., electrical circuit node 25). Based on at least the measured output voltage, the control circuit 90 determines or calculates and generates a reference current.

Some embodiments determine or calculate a reference current that is based on a multi-variable transfer function that can translate a commanded primary transformer current (e.g., a commanded current in a primary winding of a transformer in an inverter of a welding power supply) to regulate the output current of the welding system. By using the transfer function, the secondary output current (e.g., a current in the second winding of the transformer in an inverter of a welding power supply) or the welding system output current does not have be monitored to control the output current for the welding power supply or the welding system.

The current from a primary winding of a transformer of the inverter 24, 26 is measured (e.g., by a current sensor) and compared with the reference current. The control circuit 90 uses the comparison to control or set the current in the primary winding, thereby controlling or setting the current in the secondary winding of the transformer of the inverter 24, 26, the output current of the inverter 24, 26, and the output current of the welding torch 14 (e.g., the welding current). In some embodiments, the control circuit 90 uses the comparison to control a switch that can turn the inverter 24, 26 on or off.

Figure 3:
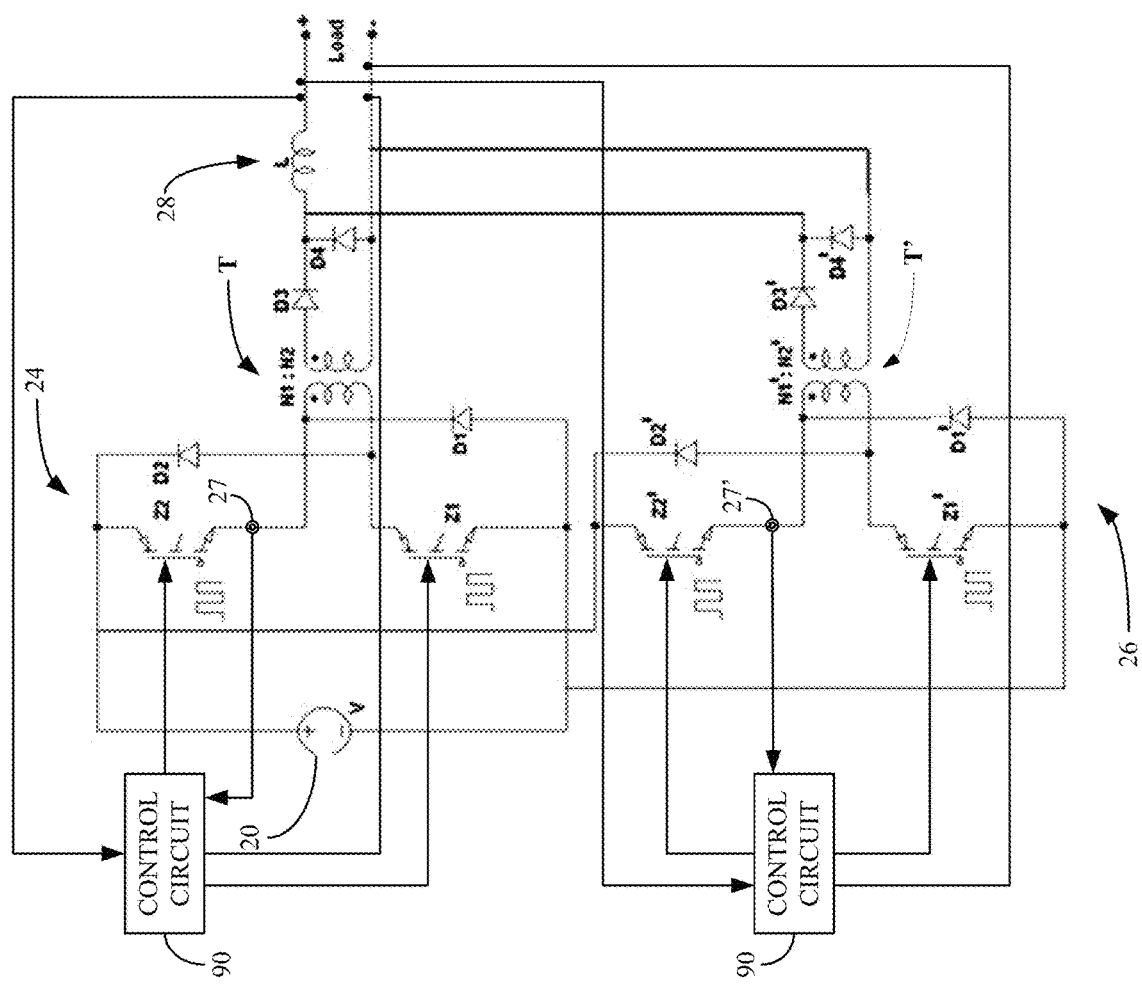
FIG. 3 shows an embodiment of interleaved inverter arrangement and a current control circuit according to the present disclosure.

FIG. 3 is a circuit diagram illustrating an embodiment of the interleaved inverter and control circuitry in the welding power supply 10 that includes, for example, a first inverter circuit 24 (e.g., a first forward inverter circuit), a second inverter circuit 26 (e.g., a second forward inverter circuit), and the control circuit 90 according to the present disclosure. The voltage or current supply 20 is configured to provide DC voltage or current to the first converter circuit 24 and the second converter circuit 26.

In the first inverter circuit 24, a pair of switches Z1, Z2 (e.g., power semiconductor switches) chops the DC voltage and supplies it to a transformer T on the side of a primary winding of the transformer T (left side of transformer T in FIG. 3). The transformer T transforms the chopped primary voltage to a secondary voltage, at a level suitable for a cutting or welding arc, and supplies it to a secondary winding of the transformer T (right side of transformer T in FIG. 3). The secondary voltage is then rectified by rectifier diodes D3, D4 and supplied to the filter inductor 28. A set of diodes D1, D2 provides a free-wheeling path for the magnetizing current stored in the transformer T to flow when the pair of switches Z1, Z2 turns off, and thus resets the magnetic flux or energy stored in the transformer core. Further, when switches Z1, Z2 are turned off, the first inverter circuit 24 is disabled and the first inverter circuit 24 no longer contributes to the output current through the filter inductor 28.

Similarly, in the second inverter circuit 26, a pair of switches Z1', Z2' (e.g., power semiconductor switches) chops the DC voltage and supplies it to a transformer T' on the side of a primary winding of the transformer T' (left side of transformer T' in FIG. 3). The transformer T' transforms the chopped primary voltage to a secondary voltage and supplies it to a secondary winding of the transformer T' (right side of transformer T' in FIG. 3). The secondary voltage is then rectified by rectifier diodes D3', D4' and supplied to the filter inductor 28. A set of diodes Dr, D2' provides a free-wheeling path for the magnetizing current stored in the transformer T' to flow when the pair of switches Z1', Z2' turns off, and thus resets the magnetic flux or energy stored in the transformer core. Further, when switches Z1', Z2' are turned off, the second inverter circuit 26 is disabled and the second inverter circuit 24 no longer contributes to the output current through the filter inductor 28.

The combined rectified secondary voltage is supplied to the welding power supply output V_out and a welding current I_out is output from the circuits 24, 26 through the filter inductor 28. In some embodiments, the inverter circuits 24, 26 can include additional components or circuits, such as capacitors, snubbers, voltage clamps, resonant "lossless" snubbers or clamps, gate drive circuits, pre-charge circuits, pre-regulator circuits, etc. In some embodiments, a single ground can be configured to support both inverter circuits 24, 26, and the output of the diodes D3, D4 of the first inverter circuit 24 would couple with the output of the diodes D3', D4' of the second inverter circuit 26 before entering the inductor 28.

As noted above, further advantages and details concerning the use of interleaved inverters in the power supply 10 can be found in U.S. Application No. 62/274,117, filed Dec. 31, 2015, and U.S. Application No. 62/286,764, filed Jan. 25, 2016, which are hereby incorporated by reference herein in their entirety.

FIG. 3 also shows the control circuit 90 according to an embodiment of the present disclosure. Although shown in FIG. 3 as two control circuits 90, the control circuit 90 can be more or less than two control circuits 90. Referring to FIG. 3, the control circuit 90 is configured to receive a feedback voltage from the output of the welding torch 14. The control circuit 90 is also configured to receive a feedback current from a current sensor 27, 27' that measures the current flowing through the primary winding N1, N1' of the transformer T, T'. Although shown separately from the control circuit 90, the current sensor 27, 27' can be part of the control circuit according to some embodiments. The control circuit 90 is further configured to provide an output signal that turns the switches Z1, Z2, Z1', Z2' on or off based on the feedback voltage from the output of the welding torch 14 and the feedback current from the current sensor. By turning the switches Z1, Z2, Z1', Z2' on or off, the control circuit 90 can control or set the current that flows through the primary winding N1, N1', thereby controlling or setting the output current of the transformer T, T', the inverters 24, 26, and the welding torch 14 (e.g., the welding current).

In some embodiments, the control circuit 90 is not configured to directly measure or sense the high output current of the welding torch 14 using an expensive current sensor that is customized for highly accurate, high current measurements such as in welding operations. Thus, the control circuit 90 can avoid the use of costly current sensors such as a high current Hall Effect sensing device.

Figure 4:
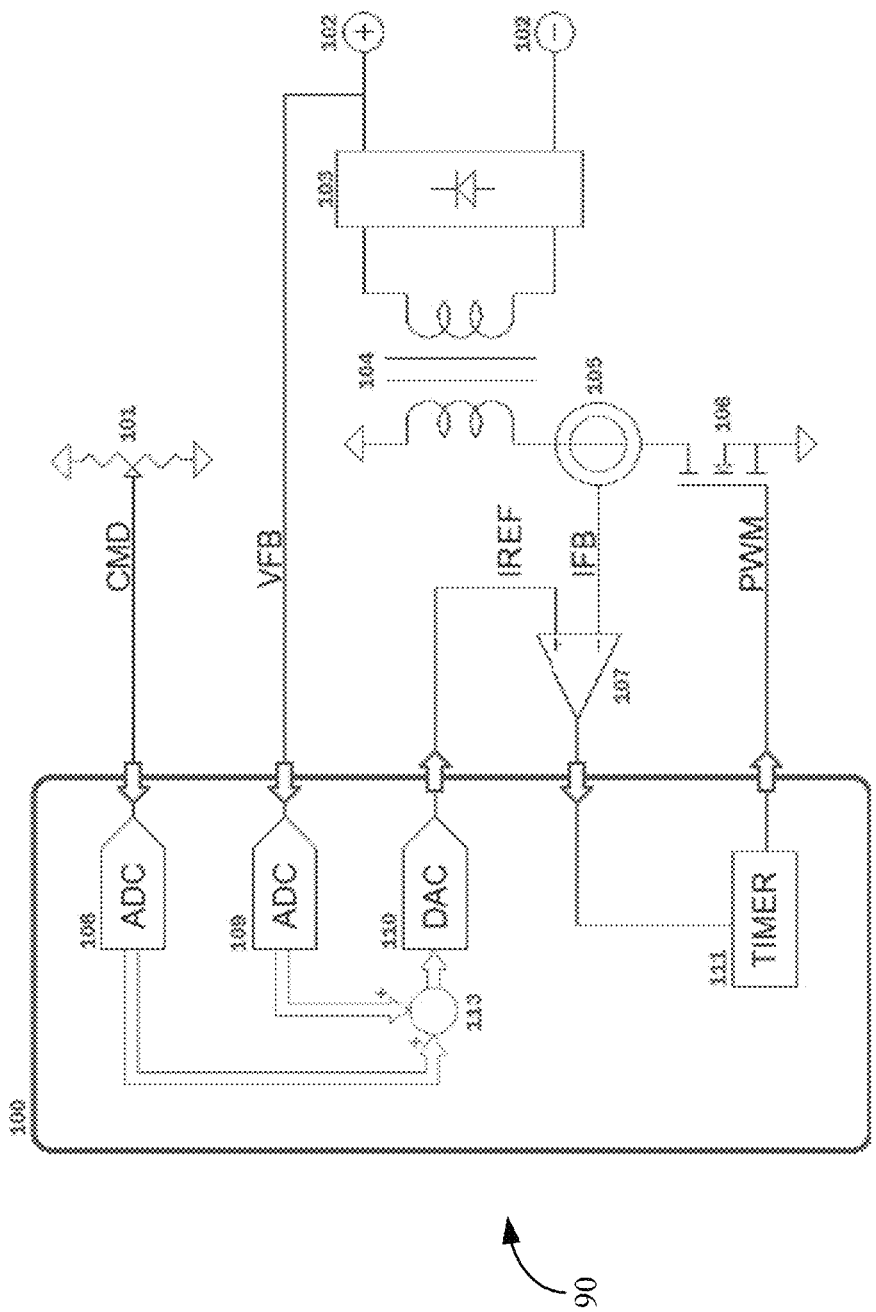
FIG. 4 shows an embodiment of a current control circuit according to the present disclosure.

The control circuit 90 and its operations are further discussed with respect to FIG. 4 which shows an embodiment of the control circuit 90 according to the present disclosure. Referring to FIG. 4, components of an inverter of a welding power supply are shown including, for example, output studs 102, an output rectifier 103, a transformer 104, and a primary switch 106. The control circuit 90 can include, for example, a controller 100, a command potentiometer 101, a current sensor 105, and a voltage comparator 107. The controller 100 is connected to the output of the welding system (e.g., at the electrical circuit node of the output studs 102), the command potentiometer 101, the voltage comparator 107, and the primary switch 106.

The controller 100 can include, for example, a potentiometer analog-to-digital converter (ADC) 108, a voltage feedback ADC 109, a primary current reference digital-to-analog converter (DAC) 110, a pulse width modulated (PWM) timer 111, and a combiner 113. The potentiometer ADC 108 is connected to the command potentiometer 101. The voltage feedback ADC 109 is connected to the output of the welding system (e.g., at the electrical circuit node of the output studs 102). The potentiometer ADC 108 and the voltage feedback ADC 109 are connected to the combiner 113 which, in turn, is connected to the primary current reference DAC 110. The primary current reference DAC 110 is connected to the voltage comparator 107. The primary winding of the transformer 104 is connected to the voltage comparator 107 via the current sensor 105 (e.g., a primary current measuring device). The voltage comparator 107 is connected to the PWM timer 111 which, in turn, is connected to the primary switch 106.

In operation, the voltage at the welding system output is directly measured by the voltage feedback ADC 109 and converted into a first digital value. A current command signal is set up at the command potentiometer 101 and received and converted into a second digital value by the potentiometer ADC 108. In some embodiments, the current command signal can be set up at an encoder or switch instead of the command potentiometer 101. The first digital value and the second digital value are combined by the combiner 113. The combiner 113 is configured in hardware and/or software to calculate or determine a combiner output (e.g., a peak primary current reference) that is received the primary current reference DAC 110. Thus, in some embodiments, the combiner 113 uses the voltage or current command CMD from the command potentiometer 101 and/or the voltage feedback VFB from the system output to determine or compute the peak primary current reference and to set an analog voltage IREF that is proportional to a commanded reference current via the primary current reference DAC 110.

In some embodiments, the combiner 113 is configured in hardware and/or software to implement a transfer function. The combiner 113 can be part of an integrated circuit (e.g., application specific integrated circuit (ASIC), programmable gate array, etc.) and/or can be part of a microcontroller, microprocessor, processor, etc. The transfer function can be, for example, a weighted combination of functions based on the first digital value and/or the second digital value. The transfer function can also account for the turns ratio of the transformer, the average output voltage of the system, and other effects of a PWM transfer function. The transfer function can also be configured for current mode control (e.g., commanded peak current control). In some embodiments, the transfer function is multi-variable and can translate the commanded primary transformer current to regulate the output current of the welding system.

The voltage comparator 107 compares the reference current IREF from the primary current reference DAC 110 and the current feedback IFB from the current sensor 105. The comparison controls the PWM timer 111. The PWM timer 111 provides a PWM signal with a 50% duty cycle, for example, that controls the primary switch 106. The primary switch 106 can cause the transformer 104 to turn on or off.

In some embodiments, in the beginning of the PWM cycle when the primary switch 106 turns on, the current increases in the transformer 104 and the current sensor 105. The current sensor 105 sends a voltage signal IFB that is proportional to the current in the primary winding of the transform 104 to one of the inputs of the voltage comparator 107. Once the voltage signal IFB increases to the level of voltage IREF at the other input to the voltage comparator 107, the voltage comparator 107 changes state and sends a signal to the PWM timer 111, which turns off the output of the PWM timer 111 and primary switch 106 for that cycle, thereby reducing the PWM duty cycle. While the primary switch 106 is off, current decreases in the transformer 140. Once the PWM timer 111 completes its PWM cycle, the process repeats itself.

In sum, some embodiments provide systems and methods that provide a constant current controller for use in welding applications such as constant current welding processes.

Some embodiments provide a control method in which the output current of the welding system is controlled and regulated by setting or controlling the current in the primary winding of the main transformer of an inverter in the welding power supply.

Some embodiments provide an advantage in that the hardware is not used to directly measure the output current of the welding system. Since the output current is typically much larger than a primary winding current in a transformer of the inverter in the welding power supply, direct current measurements of the output current require very large and expensive current transducers for feedback control. Such expensive current transducers typically employ additional power supplies and cabling that further add to the cost of the system and prohibit the mounting or integrating of the assembly on a printed circuit board. Instead, some embodiments use a very low cost current transformer as a current transducer for the current control by measuring the current through the primary winding in a transformer of the inverter in the welding power supply. Thus, some embodiments provide that current control is achieved without the expensive current sensor (e.g., a high current Hall Effect current sensor) and without directly measuring the output current of the welding power supply.

Some embodiments contemplate using other types of current sensors for measuring the current flowing through the primary winding of the transformer such as less expensive versions of resistive shunt elements or less costly versions of Hall Effect monitoring devices. Since the primary winding currents being sensed or measured are much smaller compared to the output currents of the welding system, the current sensors are generally cheaper and cheaper versions of resistive shunt elements and Hall Effect monitoring devices can be employed.

While the present methods, processes, and systems have been described with reference to certain implementations, it will be understood by those skilled in the art that various changes may be made and equivalents may be substituted without departing from the scope of the present methods, processes, and systems. In addition, many modifications may be made to adapt a particular situation or material to the teachings of the present disclosure without departing from its scope. Therefore, it is intended that the present methods, processes, and systems not be limited to the particular implementations disclosed, but that the present methods, processes, and systems will include all implementations falling within the scope of the appended claims.

What is claimed is:

1. A welding system, comprising:
a controller; and
a primary winding of a transformer that is operatively coupled to the controller, wherein the controller is configured to receive a feedback voltage from a welding output of the welding system; and
a current sensor configured to output a first signal representative of a primary current in the primary winding of the transformer,
wherein the controller is configured to control an output current at the welding output of the welding system by controlling the primary current based on a comparison of:
the first signal; and
a second signal generated based on a current command signal and the received feedback voltage.

2. The system according to claim 1, comprising:
a voltage comparator having the first signal as a first input and the second signal as a second input.

3. The system according to claim 2, wherein the voltage comparator is configured to compare the first signal and the second signal, and wherein the voltage comparator is configured to control the primary current in the primary winding of the transformer based on the comparison.

4. The system according to claim 3, wherein the controller is configured to control a pulse width modulated timer based on the comparison, and wherein the pulse width modulated timer is configured to control a switch that is operatively coupled to the primary winding of the transformer.

* * * * *